C. ARNDT.
BEET TOPPER.
APPLICATION FILED NOV. 12, 1915.

1,231,837.

Patented July 3, 1917.
3 SHEETS—SHEET 3.

WITNESSES

INVENTOR
Charles Arndt,
BY
ATTORNEY

UNITED STATES PATENT OFFICE.

CHARLES ARNDT, OF TINA, MISSOURI.

BEET-TOPPER.

1,231,837.  Specification of Letters Patent.  Patented July 3, 1917.

Application filed November 12, 1915. Serial No. 61,111.

*To all whom it may concern:*

Be it known that I, CHARLES ARNDT, citizen of the United States, residing at Tina, in the county of Carroll and State of Missouri, have invented certain new and useful Improvements in a Beet-Topper, of which the following is a specification.

My invention relates to machines for topping beets, carrots, and like biennial herbs. The object of the invention is to provide an improved mechanism for topping the beets before extraction and for gathering and conveying into a receptacle therefor, the foliage thus removed.

In describing my invention in detail reference will be had to the accompanying drawings wherein like characters denote like or corresponding parts throughout the several views, and in which.

Figure 1:
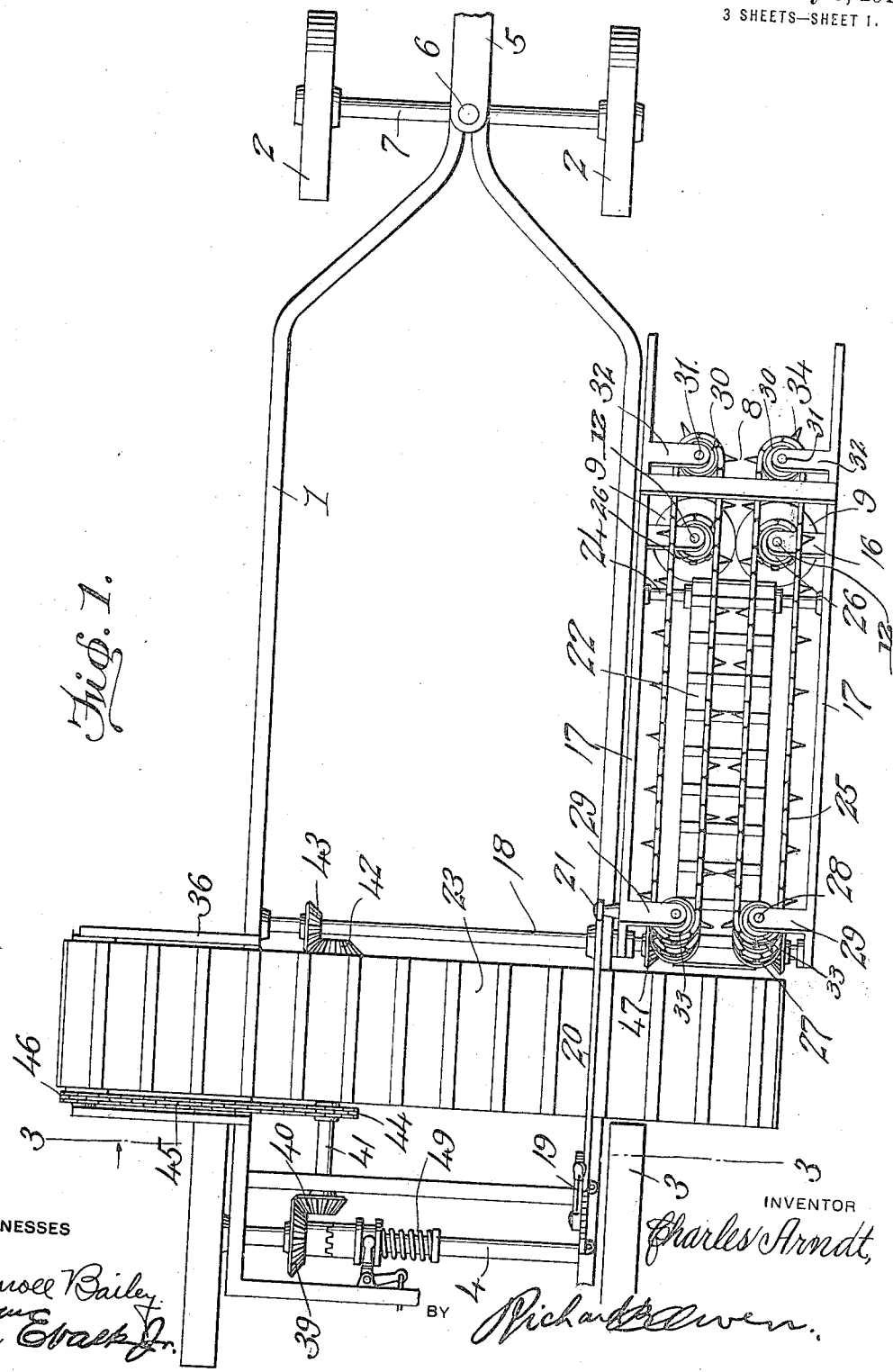
Figure 1 is a top plan view of the machine.

Referring now to the drawings by numerals, 1 designates the machine frame, 2 the front combined supporting and steering wheels, 3 the rear supporting wheels, 4 the rear axle, 5 the draft tongue, and 6 the connection between the draft tongue and the front axle, designated 7.

The topping mechanism, designated as an entirety by the numeral 8 is disposed at one side of the machine frame that the supporting wheels 2 and 3 may operate or engage with the soil at one side of the beet row acted on to preclude contact of said wheels with the untopped beets. Said topping mechanism 8 in its preferred embodiment may be said to consist of oppositely rotating circular or disk like knives 9, the mentioned knives rotating on a vertical axis in proximity to the ground. Each knife 9 is mounted on a section 10 of a shaft designated as an entirety by the numeral 11, said shaft, comprising, in addition to said section 10, a section 12 and a section 13, the latter, having a universal connection as at 14 with the section 12 and a universal connection as at 15 with the section 10. Each shaft 11 is journaled in bearings 16 therefor.

Figure 2:
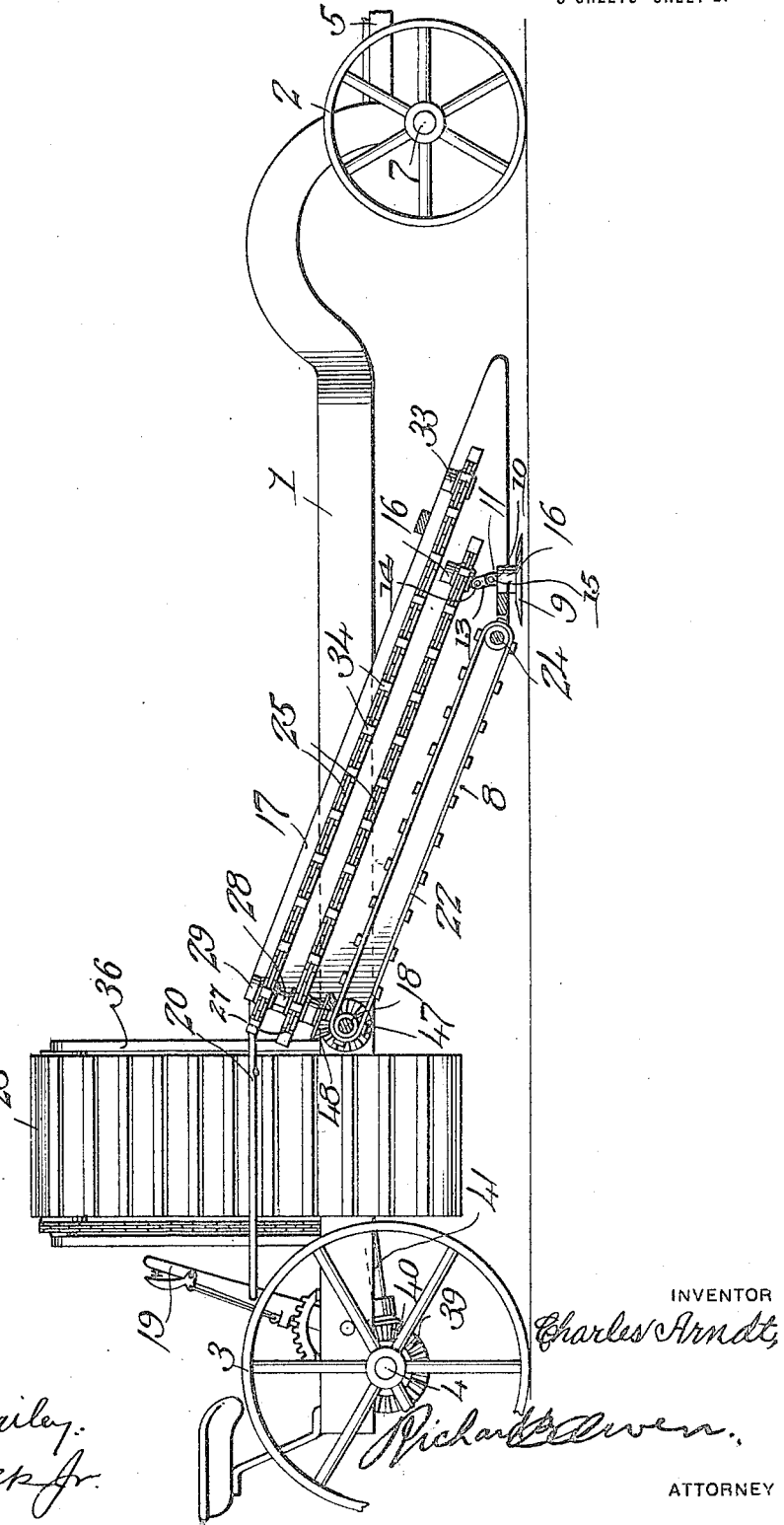
Fig. 2 is a side elevation, the topping mechanism being shown in section.
Figure 3:
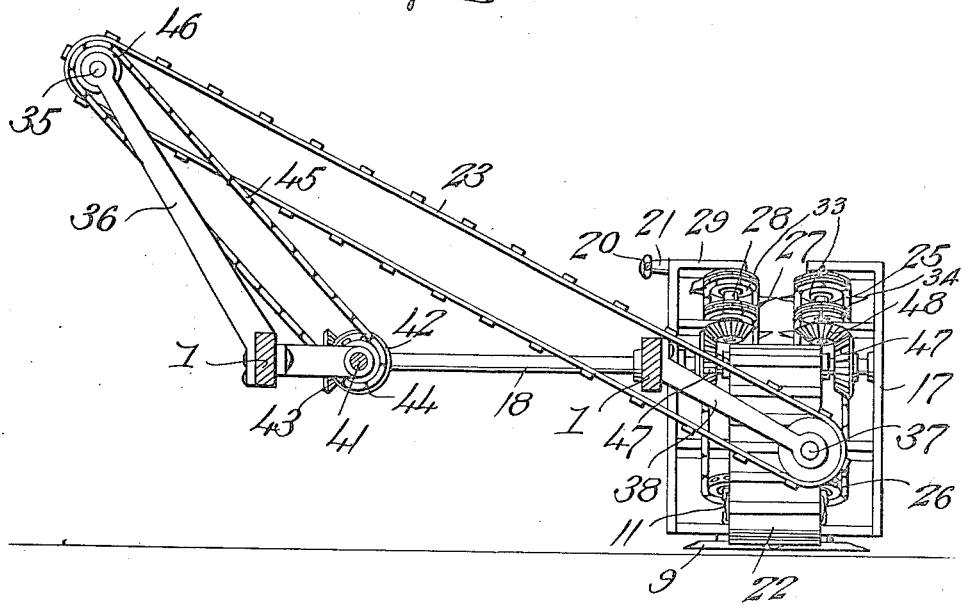
Fig. 3 is a section on the line 3—3 of Fig. 1.
Figure 4:
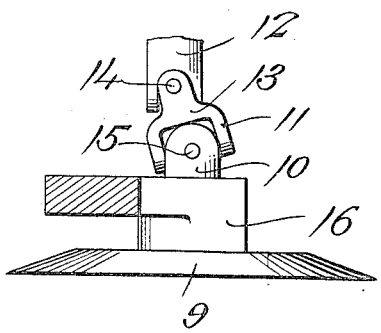
Fig. 4 illustrates the manner in which the rotary knives are mounted.

An auxiliary frame 17 (the support for the topping mechanism 8) is mounted for adjustment, vertically, on a shaft 18 acting as a support for said frame. That the mentioned frame may be adjusted and locked against movement subsequent to adjustment, I have provided a lever 19 having connection as indicated at 20 with a stud 21 secured to said frame. Manipulation of said lever will raise or lower the frame 17 and accordingly move the blades 9 either into or out of engagement with the beets. Shaft 18, as is obvious upon reference to Fig. 2, acts as a pivot for the auxiliary frame.

An endless conveyer 22 is mounted to operate directly at the rear of the blades 9 to carry the severed foliage or tops away from the blades and to a transversely disposed inclined conveyer designated 23. The conveyer 22 is mounted at one end over the shaft 18 and at its opposite end over a shaft 24 journaled in the sides of the auxiliary frame.

As a guide for the tops, cut and uncut, I have equipped the auxiliary frame with opposed endless chains 25 (four in number) the chains operating in pairs, one pair directly above the other, the pair uppermost extending forwardly beyond the pair lowermost to gather in the foliage of the uncut beets and the pair lowermost, by reason of its proximity to the conveyer 23, holding the tops during conveyance to in such manner preclude an otherwise resulting waste. The lowermost chains operate over sprockets 26 mounted on the section 12 of the shaft 11 and over sprockets 27 mounted upon shafts 28 journaled in bearings 29 carried by the auxiliary frame. The uppermost chains engage with sprockets 30 mounted on shafts 31 journaled in bearings 32 and with sprockets 33 mounted on the shaft 28. Each chain 25 is equipped with teeth or prongs 34 that the foliage directed thereto may be gasped and held.

Conveyer 23, as hereinbefore intimated, is mounted to operate transversely of the machine and in such adjacency to the conveyer 22 as to receive the deposit therefrom. Said conveyer 23 discharges at the opposite side of the frame 1 from that upon which the topping mechanism 8 is mounted. A receptacle (not shown) is supported preferably, independently of the machine which is located beneath the discharge end of the conveyer to receive the tops discharged therefrom. Said conveyer 23 at its elevated end is mounted to operate over a shaft 35 journaled in supports 36 secured to the machine frame 1 and at its opposite end over a shaft 37 journaled in supports 38 likewise secured to said frame, the mentioned supports being disposed at opposite sides of the frame, the supports 36 extending upwardly at an angle and the supports 38 downwardly at an angle to position the conveyer 23 in the manner desired.

Motion is transmitted to the conveyer 23 and to the conveyer 22 from the rear axle 4. A gear 39 is mounted on the rear axle 4 for engagement with a gear 40 mounted on a shaft 41 disposed to extend longitudinally of the machine. Shaft 41 is equipped with a second gear 42 for meshing engagement with a like gear 43 mounted on the shaft 18. Shaft 41 is further equipped with a sprocket 44 over which a chain 45 operates, the mentioned chain, by reason of its engagement with a sprocket 46 mounted on the shaft 35, imparting the desired movement to the conveyer 23. Opposed gears 47 mounted on the shaft 18 engage with duplicate gears 48 mounted on the respective shafts 28 to drive the endless chains 25. The lowermost set of chains will impart to the rotary knives 9 the desired rotary movement. Shaft 18 directly drives the conveyer 22. If desired, a clutch mechanism 49 may be mounted on the rear axle 4 to render the gear 39 idle or operative, as occasion demands.

From the foregoing, taken in connection with the accompanying drawings it will be noted that the topping mechanism 8 may be raised or lowered respectively out of and into engagement with the uncut or growing herbs; that the beets, through the agency of the chain 25, are first directed to the rotating knives 9 and subsequently to the conveyer 22; and that while the auxiliary frame 17 is adjustable, the relative position of the conveyer 22, (carried by the frame) is unchanged.

It will be understood that the above description and accompanying drawings comprehend only the general and preferred embodiment of my invention and that various miner changes in details of construction, proportion and arrangement of parts may be made within the scope of the appended claims and without sacrificing any of the advantages of my invention.

Having thus fully described my invention, what I claim as new and desire to secure by Letters Patent, is:—

1. In a beet topper, oppositely rotatable knives, an endless conveyer mounted for operation in proximity to said knives, a common means to rotate the knives and operate the conveyer, and a means to engage with the beets for moving them first into engagement with the knives and thereafter onto the conveyer, substantially as described.

2. In a beet topper, oppositely rotatable knives, an endless conveyer mounted for operation in proximity to said knives, and opposed endless chains mounted above the conveyer to extend beyond said knives to gather in and direct the beets to said knives and thereafter onto the conveyer, and a common means to operate the knives, the chains, and the conveyer.

3. In a beet topper, opposed rotatable knives, an endless conveyer mounted for operation in proximity to said knives, two pairs of opposed superimposed endless chains mounted above the conveyer to extend forwardly beyond the end thereof, prongs formed on the several chains to gather in and direct the beets to the knives and thereafter onto the conveyer, a common means to operate the conveyer, the chains and said knives, an auxiliary frame supporting the conveyer, the chains, and said knives, and a means to move said frame into and out of engagement with the ground.

4. In a beet topper, oppositely rotating knives, an endless conveyer, a pair of opposed endless chains mounted in parallelism with the conveyer to direct the severed tops onto said conveyer, a means to operate the conveyer, a means to operate the endless chains through movement of said conveyer, and a means to operate the rotatable knives through movement of the endless chains.

In testimony whereof I affix my signature in presence of two witnesses.

CHARLES ARNDT.

Witnesses:
A. Y. HOUSTON,
J. F. MCCALL.

Copies of this patent may be obtained for five cents each, by addressing the "Commissioner of Patents, Washington, D. C."